July 23, 1940.   J. I. CAIN   2,208,959
WHEEL MAKING MACHINE
Filed March 31, 1939   3 Sheets-Sheet 1
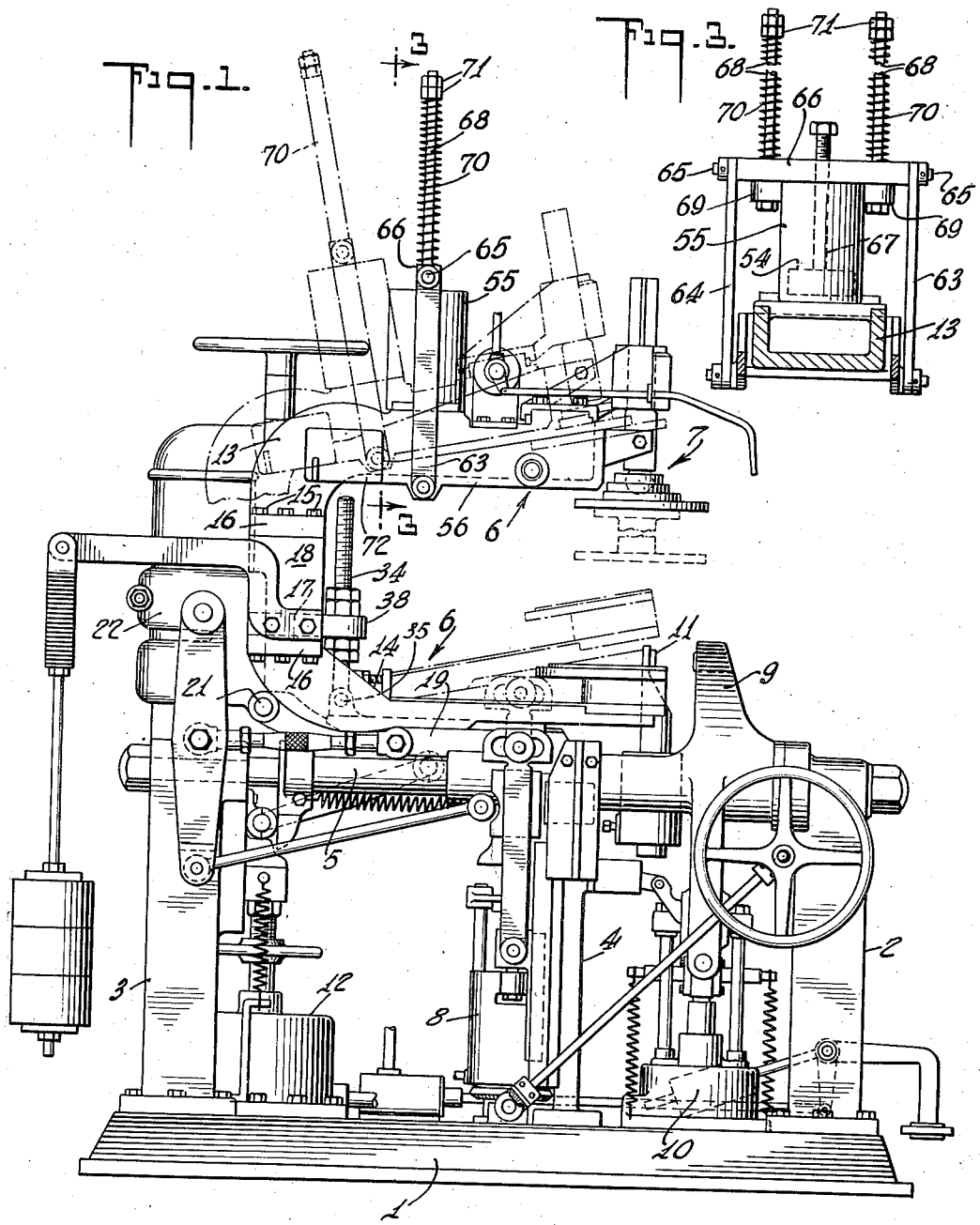
INVENTOR
Joseph I. Cain
BY
Morrison, Kennedy & Campbell
ATTORNEYS.

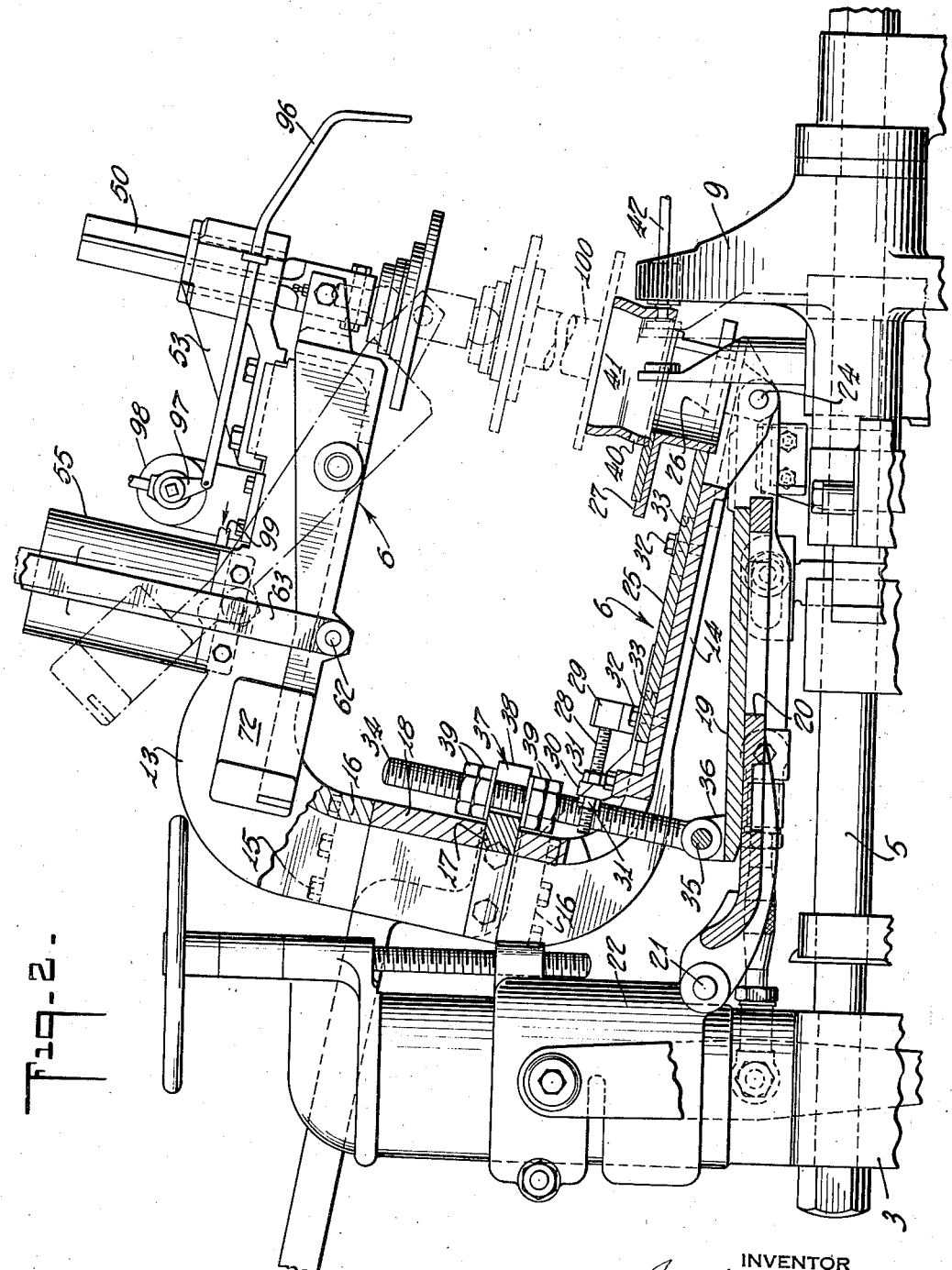

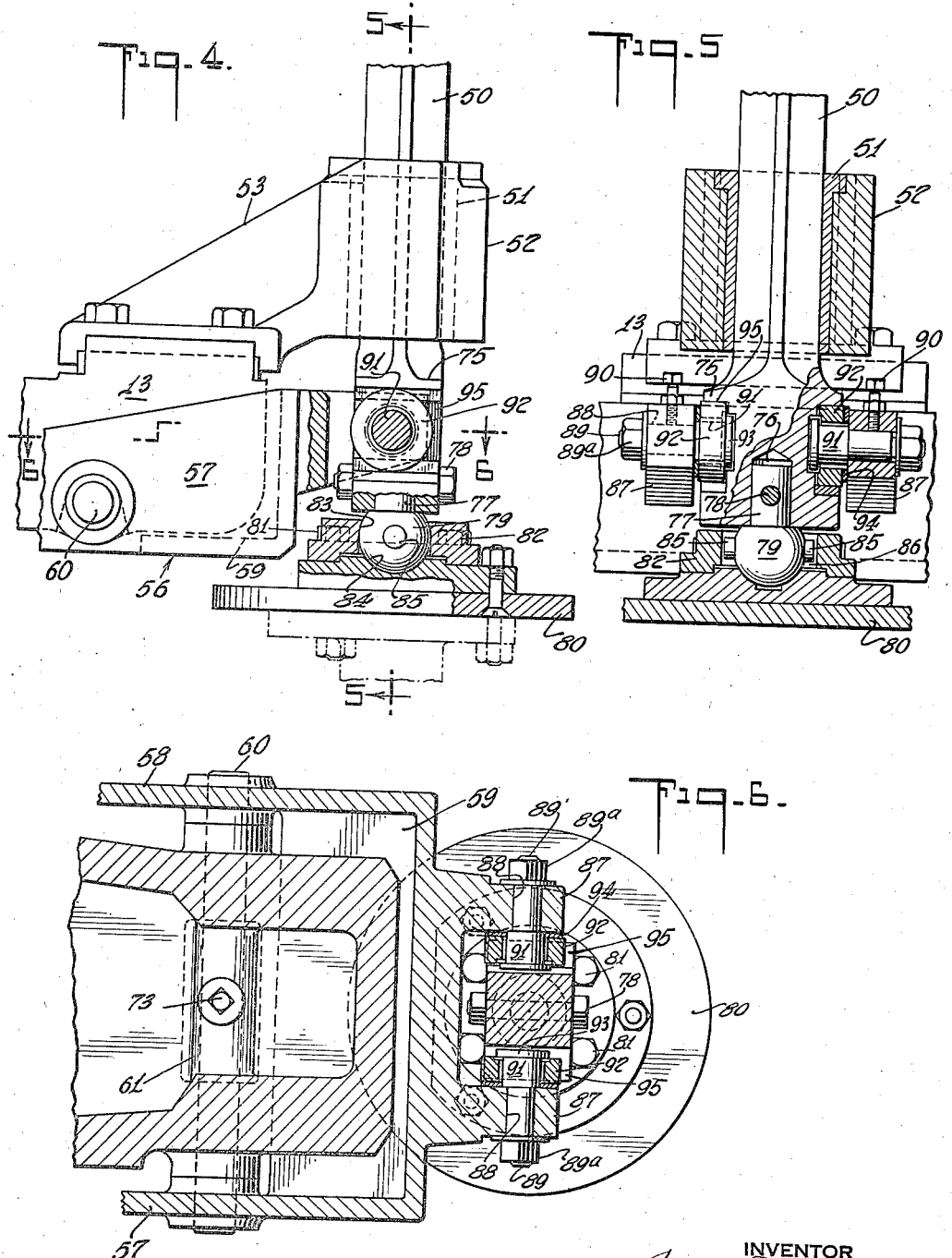

Patented July 23, 1940

2,208,959

UNITED STATES PATENT OFFICE 2,208,959

WHEEL MAKING MACHINE

Joseph I. Cain, Rock Island, Ill., assignor to French & Hecht, Incorporated, a corporation of Iowa Application March 31, 1939, Serial No. 265,176

4 Claims. (Cl. 78—16)

This invention relates to wheel making machines of the general organization represented in U. S. Letters Patent No. 640,548, wherein a wheel hub and rim to be connected by spokes are supported in the machine in concentric relation to one another and heated spokes inserted through aligned openings in the rim and hub and upset endwise simultaneously to head over the end of the spoke inside the hub and form a shoulder on the spoke to bear against the outer surface of the hub. While the present invention is adapted generally to the form of machine shown in the patent referred to, it finds its particular application in the machines as shown and described in a copending U. S. application Ser. No. 265,204, filed by John H. Ploehn, to which reference may be had for a detailed understanding of the entire machine.

In these machines, the hub and rim are supported on a pivotally mounted gooseneck table, the lower arm of which is adapted to support the hub and rim and the upper arm to carry a clamp for securing the hub in position on the table. The machine is operated pneumatically, its successive operations during each cycle being controlled by valves actuable by a foot treadle. Initially, the table occupies a position with its front end tilted upward for the insertion of a spoke through the openings in the rim and hub, and when the cycle of operation of the machine is inaugurated by a partial depression of the foot treadle, air is exhausted from a table-lifting cylinder, allowing a piston therein to descend and permitting the front end of the table to drop into operative position to lower the hub over a spoke heading tool or header and locate the portion of the spoke outside the hub between a pair of vise jaws. Further depression of the foot treadle effects the admission of air into a cylinder to raise a piston therein for actuating the vise jaws to clamp and hold the spoke against movement during the upsetting operation. After the spoke is clamped between the vise jaws, depression of the foot treadle through the remainder of its downward stroke causes the header inside the hub to move forwardly toward the vise jaws to upset and head over the heated end of the spoke against the inner surface of the hub. At the same time, the table supporting the hub moves in the same direction as the header, but only half as far, causing the portion of the spoke between the outside of the hub and the vise jaws to be upset to form the shoulder, the vise jaws being equipped with dies into which the displaced metal flows and by which it is confined to force it against the outer surface of the hub and mold it to the desired shape. When the upsetting operation is completed, relief of the pressure on the foot treadle permits its return stroke and the machine operates by the exhaust of air from the header and vise jaw actuating cylinders to effect the retraction of the table and header and the opening of the vise jaws to release the spoke, and by the admission of air to the table-lifting cylinder to tilt the front end of the table to its original upper position so that the spoke clears the top edges of the vise jaws. The hub clamp is then released to permit the turning of the hub and rim to the proper position for operation on another spoke. The operation of the machine as just set forth is repeated for each successive spoke.

The office of the hub clamp is to engage the top edge of a hub to clamp it on the table under sufficient pressure to hold it immovable during each machine operation to fasten each spoke in place, in order to make certain that the hub will be centered with respect to the rim when the wheel is finished. With the advent of a heavier and more varied class of work, particularly in the manufacture of wheels adapted for use with pneumatic tires, the hub clamping means heretofore employed have proved to be unsatisfactory and not readily adaptable to meet the new demands, resulting in a low efficiency in production, expensive waste of material and the output of a high percentage of wheels in which defects later manifest themselves in use.

It is an object of the present invention, therefore, to obviate these and other objectionable features of the prior art and to provide a new and improved clamp for holding a wheel hub in place on the table during the operation of the machine.

To this end, the present invention contemplates the provision of a quick acting clamp comprising a clamping member having a long range of movement and adapted to cooperate with hubs of varying sizes and to exert substantially uniform clamping pressure throughout all stages of its operative movement. More specifically, the hub clamp comprises a ram mounted to slide vertically in a bronze bushing arranged in a bracket fixed to the front end of the upper arm of the table, the ram having a long stroke and being operated by the rise and fall of a piston arranged in an air cylinder mounted on the top edge of the upper table arm and connected to the ram by a double arm lever pivoted to the upper table arm. The ram includes a hub engaging plate or head mounted for universal movement to accommodate itself to and equalize pressure on the hub in the event that the hub surface engaged thereby is irregular in shape.

Referring to the drawings:

Fig. 1 is a side elevation of the machine, showing by the dot and dash lines the tilted position of the wheel supporting table;

Fig. 2 is a side elevation of the upper part of the machine, partly broken away and partly in section to show the construction;

Fig. 3 is a sectional view taken on the line 3—3 of Fig. 1, looking in the direction of the arrows;

Fig. 4 is a fragmentary side elevation of the front end of the upper table arm and associated parts, partly in section and partly broken away to show the construction;

Fig. 5 is a sectional view taken approximately on the line 5—5 of Fig. 4, looking in the direction of the arrows, some of the parts being broken away; and Fig. 6 is a sectional view taken substantially on the line 6—6 of Fig. 4, looking in the direction of the arrows.

Referring particularly to Fig. 1, the machine comprises a base 1 on which front, rear and intermediate pedestals 2, 3 and 4, respectively, are mounted and which support two horizontal parallel guide bars 5 (one only being shown) which are circular in cross-section, these parts constituting the main frame of the machine. Mounted in the frame are the three fundamental units of the machine, namely, the work supporting table 6 with its associated hub-clamping ram 7 and table-lifting cylinder 8, the spoke-clamping vise jaws 9 (one only being shown) and their actuating cylinder 10, and the header 11 and its actuating cylinder 12.

The work supporting table 6 (see Fig. 2) comprises the upper and lower arms 13 and 14, respectively, spaced apart vertically at the front and joined together at the rear by bolts 15 passing through flanges 16 on the arms 13 and 14 and through spacing members 17 and 18 between the rear ends of the arms, the member 18 being adapted to be replaceable by one of different thickness to vary the vertical distance between the table arms when desired. The table 6, as a whole, includes a slide 19 arranged for reciprocation on a plate 20 which is pivoted as at 21 to a vertically adjustable collar 22 on the rear pedestal 3. The lower arm 14 of the table 6 is pivotally mounted on studs 24 at the forward end of the slide 19 and carries a plate 25 which is formed with an opening 26 in its front end to accommodate a hub support 27. The plate 25 is adapted to be adjustable fore and aft relatively to the lower table arm 14 and, for this purpose, a threaded stud 28 is fixed at one end in a lug 29 on top of the plate 25 and passes freely through an opening in a lug 30 rising from the table arm 14, a pair of adjusting nuts 31 being threaded on the stud 28 on opposite sides of the lug 30. The turning of the nuts 31 in one direction or the other moves the plate 25 forwardly or rearwardly, as the case may be, it being held in any adjusted position by the tightening of cap screws 32 extending through elongated slots 33 in the plate 25 and threaded into openings in the table arm 14.

A threaded stud 34 is pivotally connected as at 35 to a lug 36 at the rear end of the slide 19 and adapted to extend upwardly through an opening 37 formed in a forward extension 38 of the spacing member 17, adjusting and lock-nuts 39 being provided on the stud 34 on opposite sides of the extension 38 for raising and lowering the rear end of the table arms relatively to the slide 19 to locate the hub support 27 according to the angle of spoke openings 40 in the hub 41, the front end of the lower table arm 14 rocking about the studs 24 by which it is connected to the slide 19. With this arrangement, when the table 6 occupies its operative (Fig. 2 and full line Fig. 1) position, the slide 19 and the spoke 42 will lie in parallel horizontal planes, so that pressure exerted through the slide 19 during the forward movement of the slide and table to upset the spoke to form a head and shoulder thereon will always be in a plane parallel with the longitudinal axis of the spoke, regardless of the angle at which the table is disposed relatively to the slide.

The hub clamping ram 7, being mounted on the upper arm 13 of the table 6, is, of course, movable with the table and at all times occupies a fixed position with respect thereto. The ram 7 (Figs. 2, 3, 4, 5 and 6) comprises a heavy shaft 50 mounted for vertical reciprocation in a bronze bushing 51 in a bearing 52 at the forward end of a bracket 53 secured to the upper table arm 13. The shaft 50 is adapted to be reciprocated by the movement of a piston 54 in an air cylinder 55 and is connected to the piston 54 by a double arm lever 56, whose arms 57 and 58 (Fig. 6), connected by a cross-head 59, extend rearwardly on opposite sides of the table arm 13, being pivotally supported on a pin 60 mounted in a bearing 61 formed in the table arm 13 and held against movement by a locking bolt 73. Rearwardly of the pin 60, the arms 57 and 58 are pivotally connected at 62 to the lower ends of a pair of links 63 and 64, which are vertically disposed at opposite sides of the cylinder 55, the upper ends of the links 63 and 64 being pivoted on studs 65 fastened to opposite ends of a cross-head 66 through which is threaded the end of piston rod 67 of the piston 54 in the cylinder 55. The cross-head 66 is adapted to slide vertically on guide rods 68 rising from bosses 69 on opposite sides of the upper edge of the cylinder 55, being raised by the piston 54 against the action of compression springs 70 arranged on the guide rods 68 and which are held under the desired tension by adjusting and locknuts 71 threaded on the ends of the guide rods 68, the springs 70 exercising themselves to return the parts to their original positions when air is exhausted from the cylinder 55 and being assisted by the counter-balancing effect of weights 72 on the rear ends of the lever arms 57 and 58.

The lower part of the shaft 50 is enlarged, as at 75, and formed in its lower end with a drill hole 76 (Fig. 5) to accommodate a stud 77 fixed therein by a pin 78 and which is formed with a ball 79 adapted to project beyond the end of the shaft 50. A head 80 is adapted to be secured to the ball 79 in a manner to provide for a universal movement of the head 80 to allow it to accommodate itself to the edge of a hub regardless of any irregularities of its surface. In order to secure the head 80 to the ball 79, it is fastened by bolts 81 to a cap 82 adapted to be positioned over the ball 79 before the latter is fixed to the end of the shaft 50, both the cap 82 and head 80 being formed with recesses 83 and 84, respectively, conforming to the shape of the ball 79 and loosely engaging therewith when the parts are bolted together. In order to limit the rocking and rotational movement of the head 80, the ball 79 is formed with lugs 85 extending in opposite directions therefrom and adapted to fit in vertical grooves 86 formed in the cap 82.

The cross-head 59 is formed with a pair of forwardly extending lugs 87 adapted to straddle the enlarged lower end 75 of the shaft 50, each lug 87 being formed with an opening 88 adapted to accommodate a shouldered stud 89 secured therein by a nut 89ª and held against rotation by a locking bolt 90. Each stud 89 provides a bearing surface 91 on which a roller 92 is mounted and retained between a head 93 of the stud and a washer 94 adjacent the inner surface of the lug 87. The rollers 92 engage in runways 95 formed in opposite sides of the shaft 50 and which extend fore and aft throughout the width thereof, the arrangement providing a connection by which wear of the relatively movable parts is minimized.

The operation of the hub clamping ram 7 is manually controlled by a pull rod 96 connected to a crank arm 97 for actuating a valve 98 and extending toward the front of the machine. Movement of the pull rod 96 toward the front of the machine opens the valve 98 to admit air to the cylinder 55 from a main pipe line through a conduit 99 and raise the piston 54 therein. When the piston 54 rises in the cylinder 55 carrying with it the cross-head 66, the links 63 and 64 pull the lever arms 57 and 58 upwardly, moving the shaft 50 downwardly and forcing the head 80 against the upper surface of the hub 41 on the support 27. Return movement of the rod 96 closes off the supply of air to the cylinder 55 and opens a port (not shown) for the exhaust of the air from the cylinder into the atmosphere, allowing the piston 54 to descend in the cylinder under the influence of the springs 70, the lever arms 57 and 58 being rocked about the pivot pin 60 to raise the shaft 50 and release the clamping pressure of the head 82 on the hub 41. The stroke of the ram 7 is very long and adequate for hubs of usual sizes, but in cases where it is not sufficiently long, or when for any other reason it is desirable, a filler piece 100 may be secured to the head 80 of the ram.

The present invention embodies many features which particularly adapt it for the class of work for which it is intended. Among the more important features are its ruggedness for use with heavy wheels having spokes of large diameter which require the exertion of a great amount of pressure during the spoke-upsetting or forging operation of the machine, and the quick, positive action afforded by pneumatic operation. The ram has a very long stroke which adapts it for use with hubs of many different sizes or lengths, and uniform pressure is exerted by the ram throughout its full stroke, so that a tight clamping of the hub on its support is assured. The roller connection of the actuating levers with the ram is such that wear of the parts is minimized and the parts are exposed for inspection and lubrication. Another important feature is the mounting of the hub engaging head of the ram for universal movement to accommodate itself to an irregular hub surface and distribute pressure uniformly throughout the walls of the hub to hold the hub in the position in which it is located on its support.

In the accompanying drawings, the invention has been shown merely by way of example and in preferred form, but obviously many modifications and variations may be made therein and in its mode of application which will still be comprised within its spirit. For example, the invention is applicable equally as well to machines for making wheel spiders, that is, wheel hubs with spokes fastened therein and to which the rim is secured subsequently. It is to be understood, therefore, that the invention is not limited to any specific form or embodiment, except insofar as such limitations are specified in the appended claims.

Having thus described my invention, what I claim is:

1. In a wheel spoke securing machine, the combination of a gooseneck table having upper and lower arms spaced apart vertically at the front ends thereof and secured together at their rear ends, said lower arm comprising a support for a hub, a clamping ram mounted at the front of the upper arm and reciprocable vertically to clamp against the hub, an air cylinder mounted on the upper arm of the table, a piston arranged in the cylinder, means to control the admission and exhaust of air to and from the cylinder to effect the rise and fall of the piston therein, a lever rockably mounted on a pivot on the upper arm of the table, and means for connecting the lever on one side of its pivot to the piston in the air cylinder and on the other side of its pivot to the ram for actuation of the ram by the rise and fall of the piston in the air cylinder.

2. A combination according to claim 1, wherein the lever connecting the ram to the piston in the air cylinder is a double arm lever arranged with one arm extending along each side of the upper table arm.

3. A combination according to claim 1, wherein the lever connecting the ram to the piston in the air cylinder is a double arm lever arranged with one arm extending along each side of the upper table arm, and wherein each arm extends rearward beyond its connection with the piston in the air cylinder and is formed to carry a weight to counterbalance the weight of the ram.

4. A combination according to claim 1, wherein the lever connecting the ram to the piston in the air cylinder is a double arm lever arranged with one arm extending along each side of the upper table arm and being joined in front of the table arm by a cross-head formed with forwardly projecting lugs adapted to extend along opposite sides of the ram and supporting each a roller arranged to ride in a runway formed in the ram.

JOSEPH I. CAIN.